No. 687,753. Patented Dec. 3, 1901.
F. W., A. G. & E. A. HOEFER.
WIRE CRIMPING MACHINE.
(Application filed Aug. 3, 1901.)
(No Model.) 5 Sheets—Sheet 1.
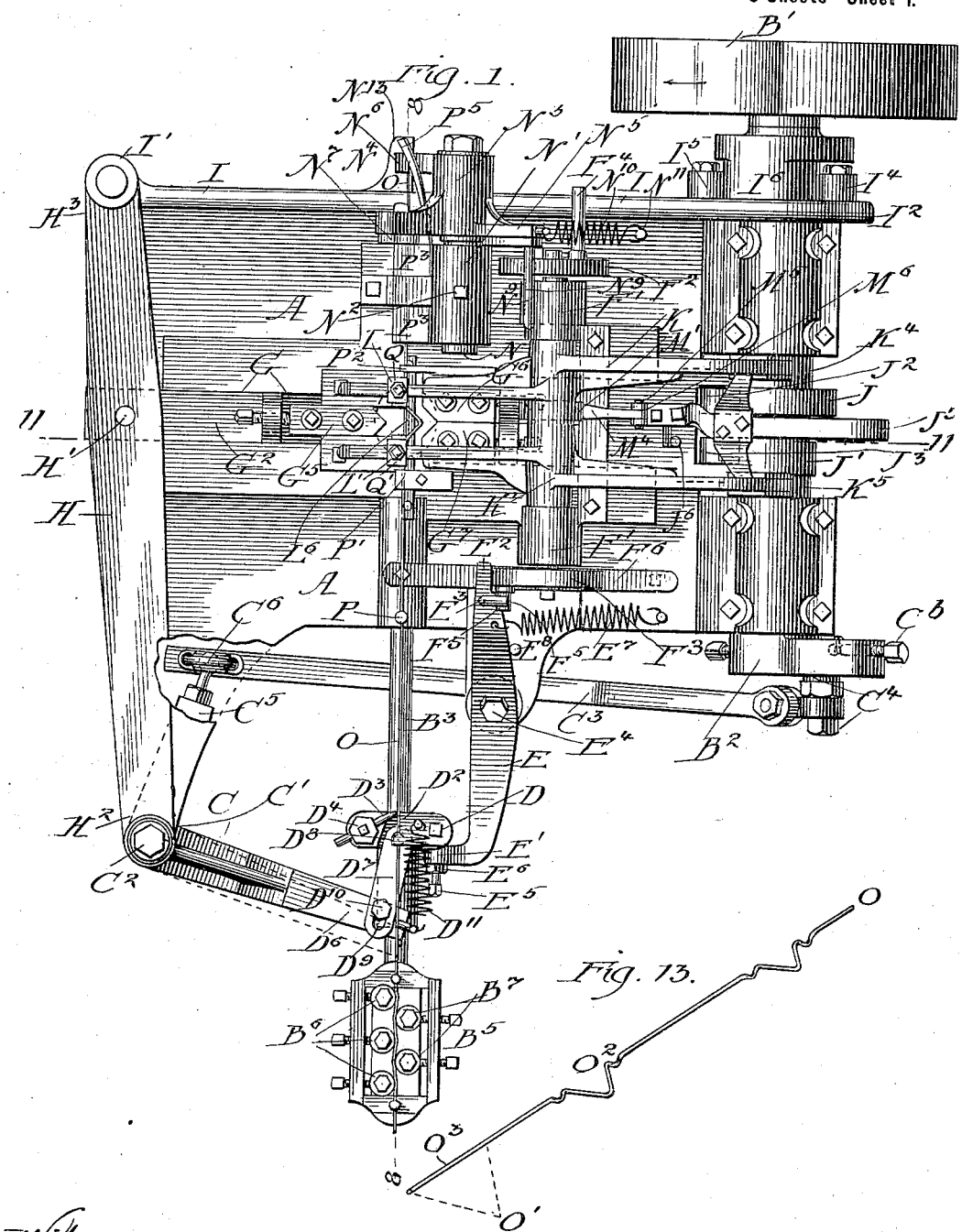
Witnesses:
Frank F. Blanchard
Mary Daly
Inventors:
Frederick W. Hoefer.
August G. Hoefer.
Emil A. Hoefer.
By W. W. Worrinaw,
Attorney No. 687,753. Patented Dec. 3, 1901.
F. W., A. G. & E. A. HOEFER.
WIRE CRIMPING MACHINE.
(Application filed Aug. 3, 1901.)
(No Model.) 5 Sheets—Sheet 2.
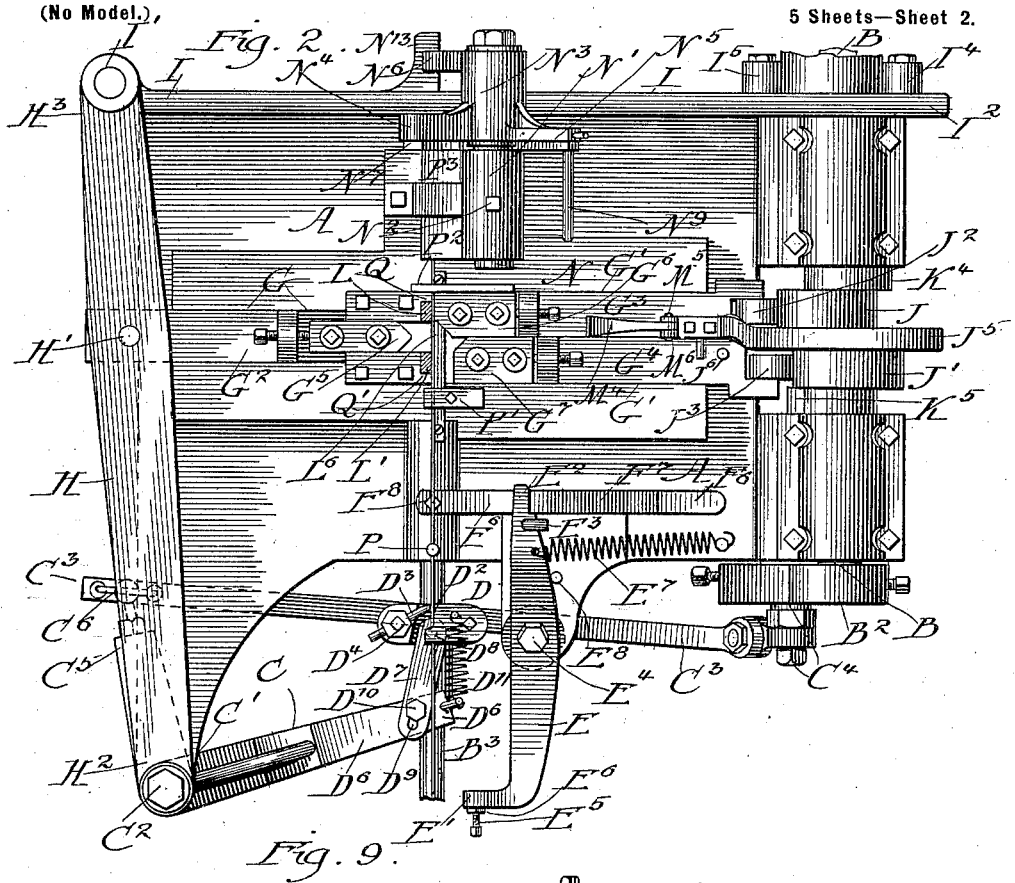
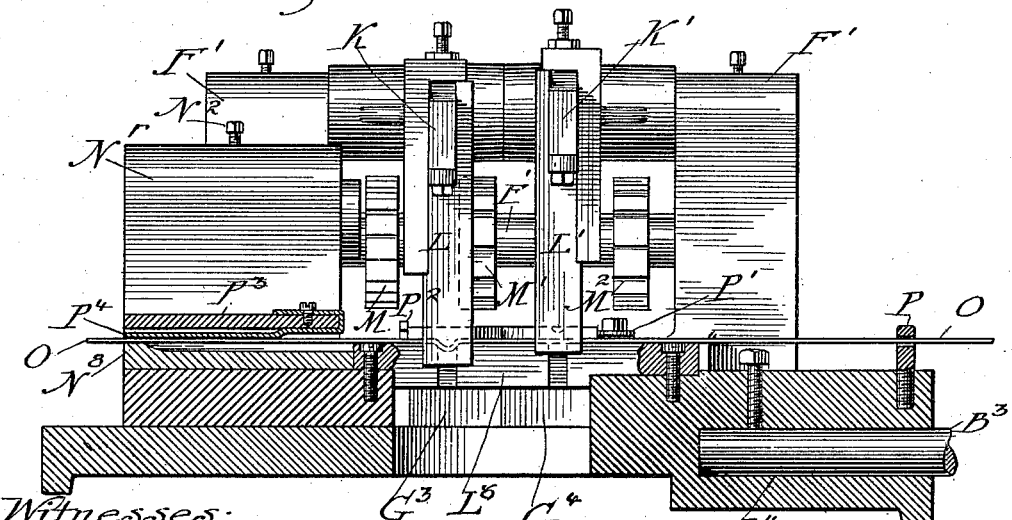
Witnesses: Inventors:
Frank D. Blanchard Frederick W. Hoefer
August G. Hoefer
Mary Daly Emil A. Hoefer
By L. N. Morrison,
Attorney.
THE NORRIS PETERS CO., PHOTO-LITHO., WASHINGTON, D. C.

No. 687,753. Patented Dec. 3, 1901.
F. W., A. G. & E. A. HOEFER.
WIRE CRIMPING MACHINE.
(Application filed Aug. 3, 1901.)
(No Model.) 5 Sheets—Sheet 3.
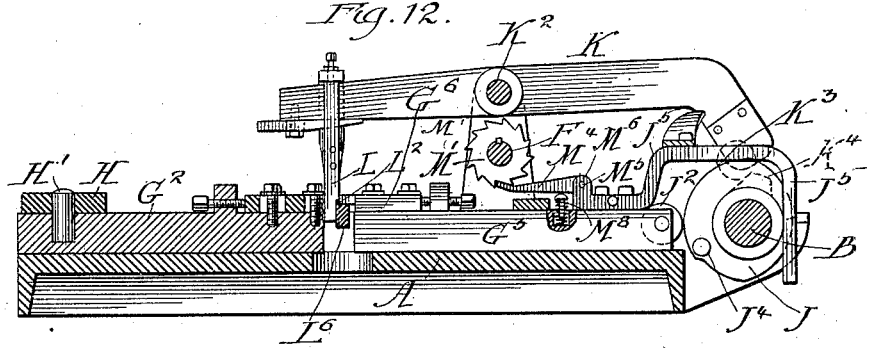
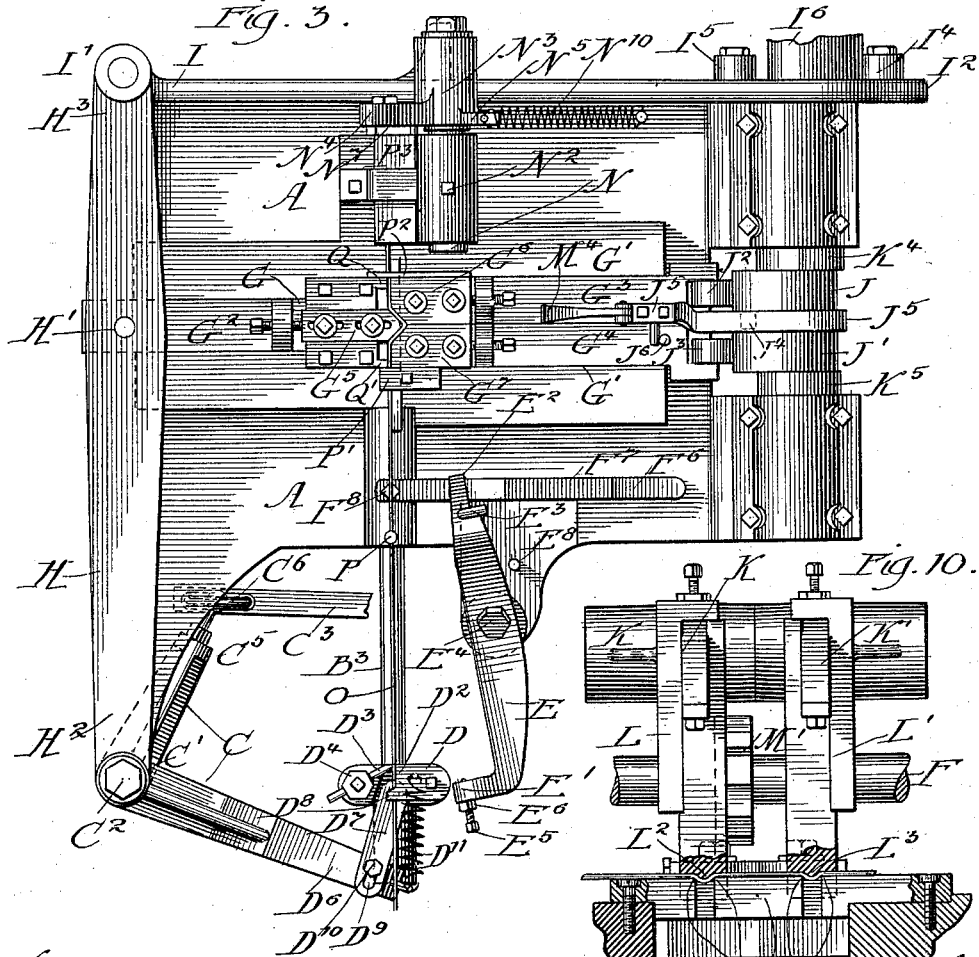
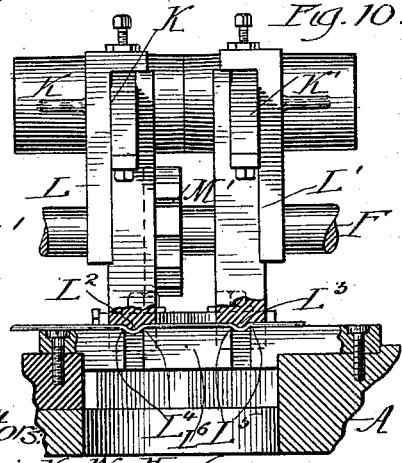
Witnesses:
Frank Blanchard
Mary Daly
Inventors:
Frederick W. Hoefer.
August G. Hoefer.
Emil A. Hoefer.
By H. N. Morrison,
Attorney No. 687,753. Patented Dec. 3, 1901.
F. W., A. G. & E. A. HOEFER.
WIRE CRIMPING MACHINE.
(Application filed Aug. 3, 1901.)
(No Model.) 5 Sheets—Sheet 4.
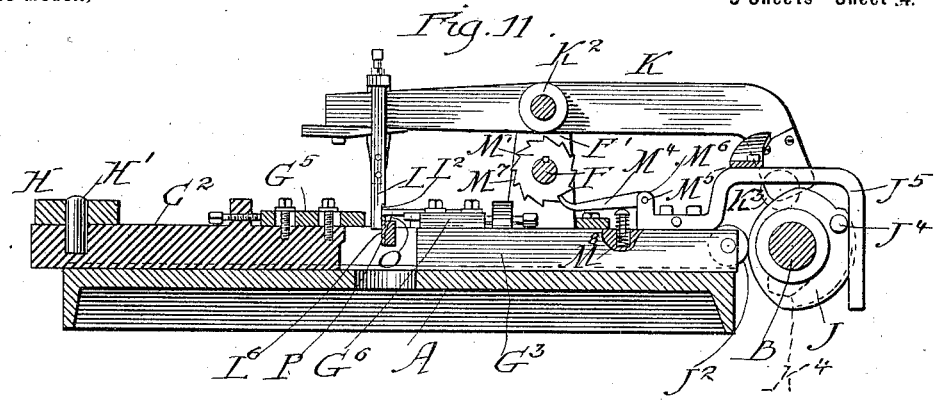
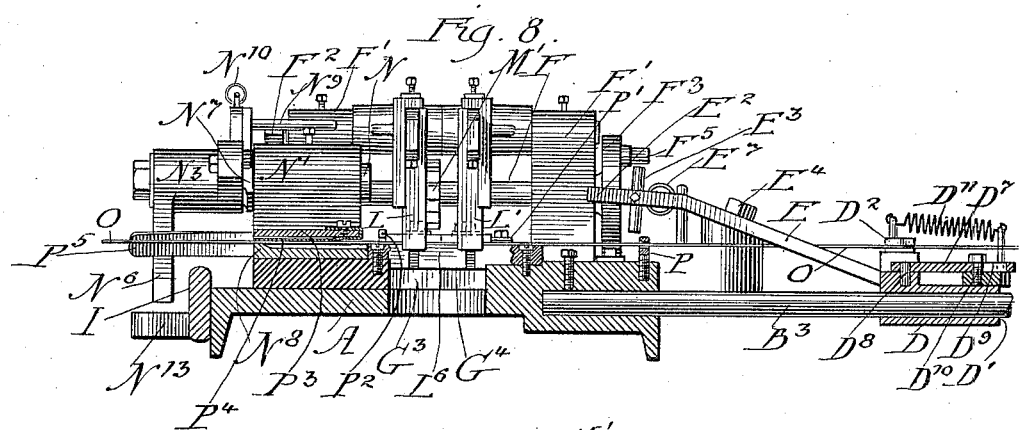
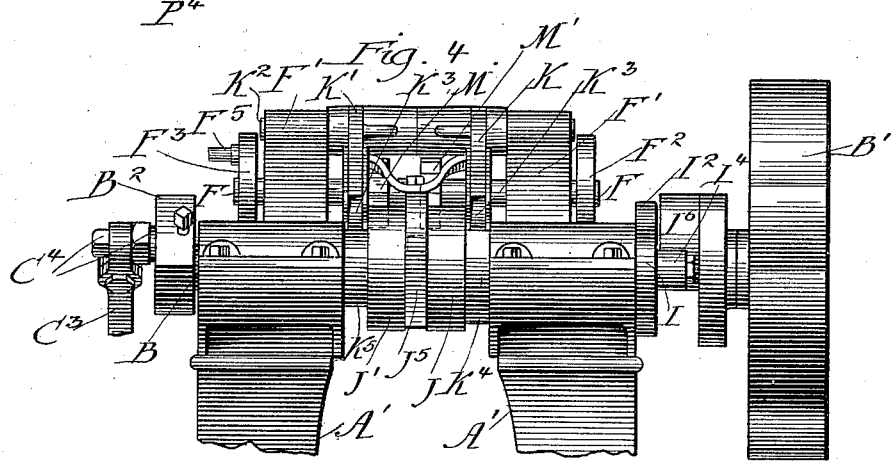
Witnesses:
Frank J. Blanchard
Mary Daly
Inventors:
Frederick W. Hoefer
August G. Hoefer
Emil A. Hoefer
By W. L. Morrison,
Attorney.

No. 687,753. Patented Dec. 3, 1901.
F. W., A. G. & E. A. HOEFER.
WIRE CRIMPING MACHINE.
(Application filed Aug. 3, 1901.)
(No Model.) 5 Sheets—Sheet 5.
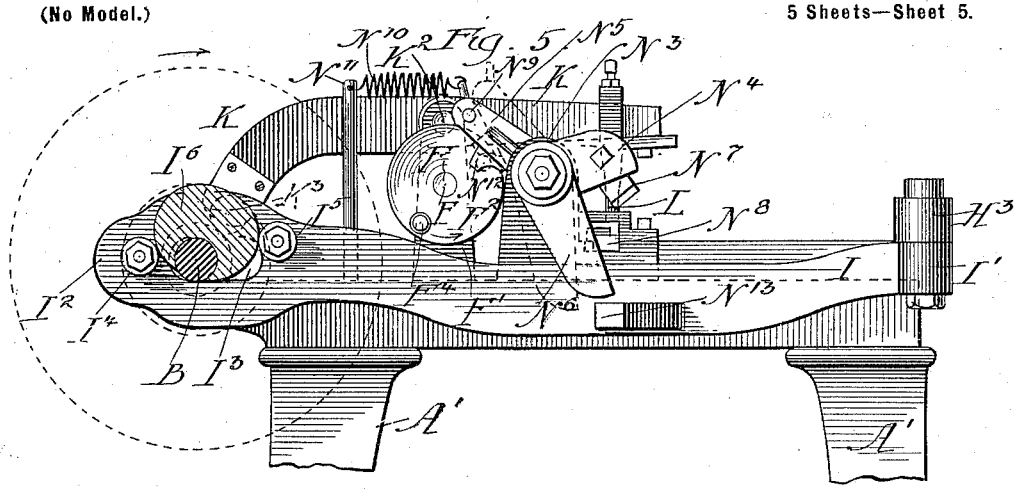
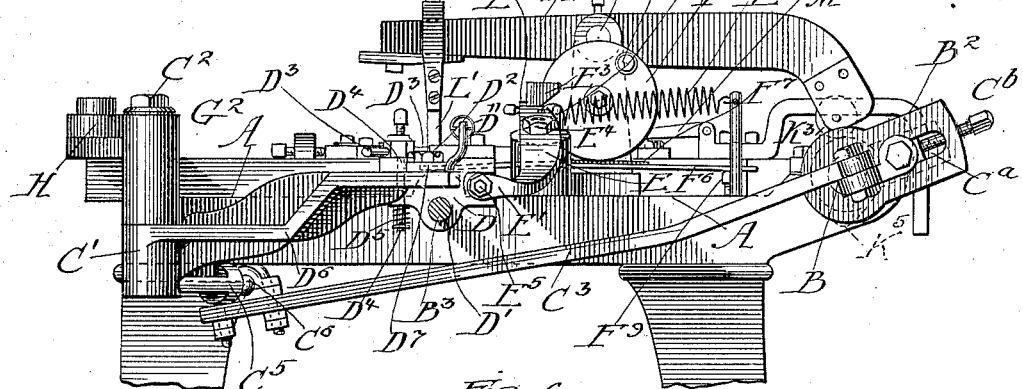
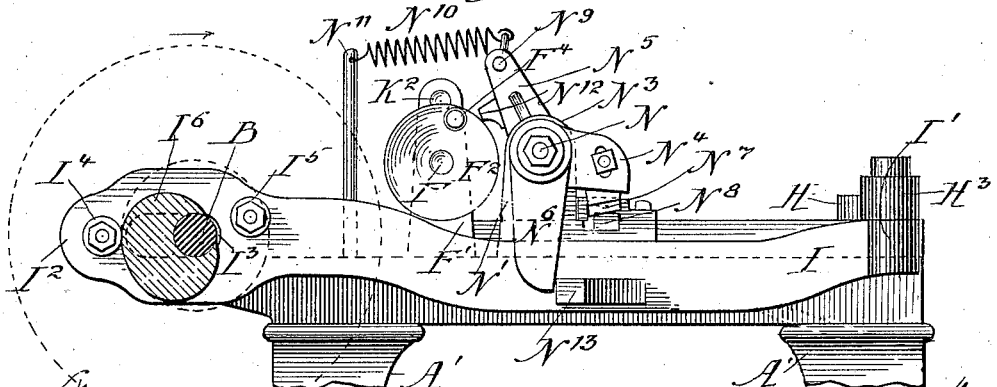
Witnesses
Frank Blanchard
Mary Daly
Inventors:
Frederick W. Hoefer
August G. Hoefer
Emil A. Hoefer
By
Attorney

UNITED STATES PATENT OFFICE.

FREDERICK W. HOEFER, AUGUST G. HOEFER, AND EMIL A. HOEFER, OF FREEPORT, ILLINOIS, ASSIGNORS TO HOEFER MANUFACTURING COMPANY, OF FREEPORT, ILLINOIS, A CORPORATION OF ILLINOIS.

WIRE-CRIMPING MACHINE.

SPECIFICATION forming part of Letters Patent No. 687,753, dated December 3, 1901.

Application filed August 3, 1901. Serial No. 70,825. (No model.)

*To all whom it may concern:*

Be it known that we, FREDERICK W. HOEFER, AUGUST G. HOEFER, and EMIL A. HOEFER, citizens of the United States of America, residing at Freeport, in the county of Stephenson and State of Illinois, have invented certain new and useful Improvements in Wire-Crimping Machines, of which the following is a specification.

Our invention relates to improvements in wire-crimping machines which are adapted to crimp wire for a variety of purposes, suitable interchangeable dies being provided therefor; and it consists of certain new and useful features of construction and combinations of parts especially devised to that end, all as hereinafter fully described, and specifically pointed out in the claims.

Referring to the accompanying drawings, which form a part of this specification, Figure 1 is a top plan view of a wire-crimping machine embodying our improvements. Fig. 2 is a like view of the same with some of the upper parts thereof removed and other parts in different positions. Fig. 3 is also a like view of the parts shown in Fig. 2 with some of said parts in still different positions. Fig. 4 is a rear elevation of the machine with the corresponding parts thereof in the same positions as in Fig. 1. Fig. 5 is a right side elevation of the same with the corresponding parts thereof also in the same positions as in Fig. 1. Fig. 6 is also a right side elevation of the same with the corresponding parts thereof in positions different from those in Fig. 5. Fig. 7 is a left side elevation of the same with the parts thereof in the positions they assume when the parts shown in Fig. 6 are in the positions there shown. Figs. 8, 9, and 10 are vertical sections at the dotted line 8 8 in Fig. 1 of parts there shown. Figs. 11 and 12 are vertical sections at the dotted line 11 11 in Fig. 1 of parts there shown. Fig. 13 shows a segment of wire having two sets of crimps therein of such forms and in such relative positions as the dies now in the machine would produce if operated.

Like letters of reference indicate corresponding parts throughout the several views.

A is an approximately rectangular bed provided with legs A'. Supported on the bed A are means for intermittently feeding wire from a coil, means for regulating the feed so as to force forward a slightly-increased amount of wire at predetermined times, means for crimping the wire vertically or horizontally, or both, if desired, at regular intervals, and means for severing the wire after being crimped, also at regular intervals.

B is the driving-shaft of the machine and is mounted in the bed A thereof and provided at one end with a driving-pulley B' and at the other end with a crank-arm $B^2$.

$B^3$ is a grip-carriage track having one end thereof secured into a supporting-socket $B^4$ in the bed A and provided at its other end with a head $B^5$, having mounted therein two parallel series of wire-straightening rolls $B^6 B^7$.

C is a bell-crank mounted by its angle C' on a pivot-bearing $C^2$ on the bed A.

$C^3$ is a longitudinally-reciprocating pitman connecting a wrist-pin $C^4$, which is rendered adjustable lengthwise of the crank-arm $B^2$ by means of the longitudinal slot $C^a$ therein and the adjusting-screw $C^b$, with the free end of the arm $C^5$ of the bell-crank C by means of a universal joint $C^6$.

D is a grip-carriage having a circular opening D' therethrough, Figs. 7 and 9, to admit the track $B^3$, whereon it is slid. The grip-carriage D is provided with a grip consisting of a stationary jaw $D^2$ and a gripping-finger $D^3$, supported by a short rock-shaft $D^4$, vertically mounted in such grip-carriage D, which is normally impelled by means of the spiral actuating-spring $D^5$, Fig. 7, to firmly press the point of such finger $D^3$ against the jaw $D^2$. The grip-carriage D is also yieldingly connected with the arm $D^6$ of the bell-crank C by means of a link $D^7$, jointed to such carriage D by means of a pivot $D^8$ and to such arm $D^6$ by means of a longitudinal slot $D^9$ therein and a pin $D^{10}$, passing through such slot $D^9$ into a retaining-socket in such arm $D^6$. A tension-spring $D^{11}$ also connects the grip-carriage D with the free end of the arm $D^6$ of the bell-crank C and normally acts, when said grip-carriage is free to move backward, as in Fig. 3, to force it to its outward limit of travel along the track $B^3$.

E is a grip-carriage stop-lever having its end $E'$ bent into the path of the grip-carriage D, Figs. 1, 2, and 7, and its end $E^2$ provided with an upwardly-inclined tripping-cam $E^3$, Fig. 7, and mounted at its central portion on a pivot $E^4$ on the base A.

$E^5$ is a screw passing through a threaded opening in the bent portion $E'$ of the stop-lever E and serving as an adjustable stop to regulate the amount of backward travel of the grip-carriage D when such stop-lever E is in the position shown in Figs. 1, 2, and 7.

$E^6$ is a nut for setting the screw $E^5$ at any desired point in its bearing.

$E^7$ is a tension-spring normally retaining the stop-lever E in the position shown in Figs. 1, 2, and 7 and against the stop-lug $E^8$ on the base A.

F is a shaft rotatably mounted in bearings in the lugs $F'$ on the base A and has mounted fast to the end portions thereof wrist-wheels $F^2$ $F^3$, having wrist-pins $F^4$ $F^5$ projecting outwardly therefrom. A friction device to prevent the too easy rotation of the shaft F and its wrist-wheels $F^2$ $F^3$ is formed, preferably, of a strip of metal $F^6$, having a strip of leather $F^7$ made fast thereto and the whole secured by means of a screw $F^8$ to the base A and rendered vertically adjustable by means of a screw $F^9$, Fig. 7.

G $G'$ are slideways formed in the base A of the machine, wherein slides $G^2$ $G^3$ $G^4$, carrying crimping-dies $G^5$ $G^6$ $G^7$, are horizontally reciprocated by means to be described hereinafter. The dies $G^5$ $G^6$ $G^7$ may be secured to their slides by means of screws inserted through the former into the latter, as clearly shown in Figs. 1 and 11, or in any other desired manner.

H is a lever for operating the die-slide $G^2$, to which it is connected by means of a pivot $H'$ and is mounted by one end $H^2$ thereof on the pivot-bearing $C^2$ on the base A.

I is a slide-bar pivoted by one end $I'$ to the end $H^3$ of the lever H and supported at its other end $I^2$ by means of the driving-shaft B, passing through a longitudinal slot $I^3$ therein. The slide-bar I is provided with two roller-studs $I^4$ $I^5$, projecting therefrom into engagement with the periphery of the cam $I^6$, which is located between the roller-studs $I^4$ $I^5$ and is fast to the driving-shaft B.

J $J'$ are cams fast to the driving-shaft B, which, acting through the antifriction-rollers $J^2$ $J^3$, mounted in the slides $G^3$ $G^4$, force the dies $G^6$ $G^7$ forward to horizontally crimp the wire passing through the machine.

$J^4$ is a cam, also fast to the driving-shaft B, which, acting through the curved arm $J^5$, fast to the slide $G^3$, and the lug $J^6$ on the slide $G^4$, withdraws the dies $G^3$ $G^4$ after each horizontal crimping operation.

K $K'$ are levers mounted at their central portions on the pivot-bearing $K^2$ in the lugs $F'$ on the base A. In the rear ends of the levers K $K'$ are mounted antifriction-rollers $K^3$, contacting cams $K^4$ $K^5$, fast to the driving-shaft B, which actuate such levers K $K'$.

L $L'$ are arms fast to and projecting vertically downward from the front ends of the levers K $K'$. Dies $L^2$ $L^3$, Fig. 10, for pressing the wire downward into counterpart lower dies $L^4$ $L^5$ in the bed-piece $L^6$ to vertically crimp the same, are secured to the lower and free ends of such arms L $L'$.

M $M'$ $M^2$, Fig. 9, are three ratchet-wheels splined onto the shaft F, so as to rotate it and at the same time admit of being slid endwise thereon, if desired. No two of these ratchet-wheels have the same number of teeth, and either of them may be slid along its shaft F into action, according as it is desired that such shaft shall be rotated more or less rapidly.

$M^4$ is a pawl mounted on the pivot $M^5$ in the lug $M^6$ on the arm $J^5$ and normally held into engagement with the ratchet-wheel $M'$, which is here shown as having twelve teeth $M^7$ and in proper position to be engaged thereby by means of the actuating-spring $M^8$.

N is a stud-axle longitudinally adjustable in a bearing $N'$, wherein it is secured by means of a set-screw $N^2$.

$N^3$ is a rocking hub mounted to oscillate on the stud-axle N and provided with transversely-projecting arms $N^4$ $N^5$ $N^6$. The arm $N^4$ carries a knife $N^7$, which coöperates with the lower knife $N^8$, longitudinally adjustable in the base A, to sever the wire after it is crimped. The arm $N^5$ carries a transverse pin $N^9$, which serves as a stop to limit the travel in one direction of the rocking hub $N^3$ by coming in contact with the lug $F'$, Figs. 1 and 5, where it is normally held by means of the tension-spring $N^{10}$, which extends from the free end of such arm $N^5$ to a stud $N^{11}$, fast to the base A. The arm $N^5$ also carries a cam $N^{12}$, Fig. 5, against which the wrist-pin $F^4$ on the wrist-wheel $F^2$ acts to depress the arm $N^6$ to the position shown in dotted lines in Fig. 5, whereupon the lug $N^{13}$ on the slide-bar I, Fig. 6, engages such arm $N^6$ and therethrough causes the knife $N^7$, coöperating with the knife $N^8$, to sever the wire.

Suppose the driving-shaft B to be rotating and a wire O, Figs. 1 and 9, to extend between the straightening-rolls $B^6$ $B^7$, thence between the stationary jaw $D^2$ and spring-actuated gripping-finger $D^3$ of the grip-carriage D, thence through the guides P $P'$ $P^2$, under the shield $P^3$ and spring $P^4$, and thence outward against the guide $P^5$, Fig. 1, and that the dies $G^2$ $G^6$ $G^7$ $L^2$ $L^3$ have just formed one set of crimps therein and been retired to the positions shown in Figs. 1 and 11, thus releasing the wire O, whereupon the bell-crank C will have been swung by the crank-arm $B^2$ and pitman $C^3$ from the position shown in Fig. 1 to the position shown in Fig. 2, and the wire O will have been slid endwise through the machine by means of the grip-carriage D a corresponding distance. The cam J, acting through the slide G³, next advances the die G⁶ to the position shown in Fig. 2, thereby gripping the wire O between such die G⁶ and the stationary jaw Q on the base A, and the cam K⁴, acting through the lever K, next depresses the cam L² to the position shown in Fig. 10. The cam I⁶, acting through the parts I H G², next advances the cam G⁵ to the position shown in Fig. 3. The cam J', acting through the slide G⁴, next advances the die G⁷ to the position shown in Fig. 3, and the cam K⁵, acting through the lever K', next depresses the die L³ to the position shown in Fig. 10, and a second set of crimps will have thus been completed. The dies L² L³ are next alternately elevated out of action by the weight of the rear portions of their levers K K', which descend from their actuating-cams K⁴ K⁵ immediately after such dies have been alternately depressed by such levers to the positions shown in Fig. 10. During the time that the dies L² L³ were acting and being elevated out of action the bell-crank C was moving the grip-carriage D backward on its track B³ from the position shown in Fig. 2 to that shown in Fig. 1, the wire O being firmly gripped between the ends of the dies G⁵ G⁶ G⁷ and the jaws Q Q' and the spring D⁵, Fig. 7, permitting the gripping-finger D² to yield sufficiently to allow the latter and the stationary jaw D² to slide backward along such wire O. Immediately after the grip-carriage D³ had reached the position shown in Fig. 1 the cam I⁶, acting through the sliding bar I and the lever H, and the cam J⁴, acting through the arm J⁵ and lug J⁶, simultaneously retired the cams G⁵ G⁶ G⁷ from the position shown in Fig. 3 to that shown in Fig. 1. Remembering that the ratchet-wheel M' has twelve teeth M⁷ and assuming that each forward movement of the slide G³, acting through the pawl M⁴, turns such ratchet-wheel M' and its shaft F one-telfth of a revolution, and, further, assuming that the machine has continued to run and continued its crimping operations until the ratchet-wheel M' is being turned the last twelfth of a revolution and that the wrist-pin F⁵, Fig. 1, is engaging the tripping-cam E³ on the end E² of the grip-carriage stop-lever E and will swing it to the position shown in Fig. 3 just before the grip-carriage D completes its twelfth backward movement, then the latter, being thus left unrestrained by the stop-lever E, will travel farther backward than heretofore and to the position shown in Fig. 3 and will consequently carry forward in its next advance movement an increased amount in length of wire, as O'. Just after the grip-carriage D has thrust forward such increased amount of wire O' and the dies have formed the twelfth set of crimps O² in the wire O the wrist-pin F⁴, Fig. 5, on the wrist-wheel F² will engage the cam N¹² on the arm N⁵ and turn the hub N³ and its arm N⁶ to the position shown in dotted lines in Fig. 5, when the lug N¹³ on the slide-bar I will engage the same and turn such hub N³ until the knife N⁷ on the arm N⁴, coöperating with the stationary knife N⁸, severs the portion O' of the wire O, say at O³. This additional length of wire O' furnishes means of attaching and securing the ends of the crimped wire O to any desired supports. The rocking hub N³ and arm N⁴, with its knife N⁷ and the knife N⁸, may be so adjusted longitudinally in their bearings as to adapt them to bisect the increased amount of wire O' passed through the machine by the grip-carriage D after each twelfth complete cycle of crimping operations, thereby insuring an equal amount of extra wire at each end of each segment of wire turned out by the machine.

With all the parts of the machine arranged as hereinbefore shown and described it will automatically form and cut off segments of wire having twelve sets of crimps O² therein, which are designed to secure together the ends of springs such as are used in spring-beds and the like; but by substituting ratchet-wheels having different numbers of teeth and dies of different forms and sizes for the ratchet-wheel M' and the dies now in the machine obviously wire segments with corresponding variations may be turned out thereby.

We claim as new and desire to secure by Letters Patent—

1. In a wire-crimping machine, in combination, a grip-carriage track, a grip-carriage D and its grip—the latter consisting of a stationary jaw D² and a spring-actuated gripping-finger D³ coöperating therewith—adapted to be impelled back and forth on said track, and means for so impelling said grip-carriage and grip thereon, substantially as and for the purpose specified.

2. In a wire-crimping machine, in combination, a supporting-bed, a grip-carriage track projecting therefrom and supported thereby, a grip-carriage, adapted to be slid back and forth on the track and provided with a grip, consisting of a stationary jaw and a spring-actuated gripping-finger coöperating therewith, a driving-shaft mounted in the machine-supporting bed, a crank-arm fast to the driving-shaft, a bell-crank, mounted on such supporting-bed and connected, through one of its arms, with the grip-carriage, and a pitman, connecting the crank-arm with the remaining arm of the bell-crank, substantially as and for the purpose specified.

3. In a wire-crimping machine, in combination, a supporting-bed, a grip-carriage track supported thereby, a grip-carriage and its grip, mounted on said track, a bell-crank mounted on the supporting-bed, a yielding connection—consisting of a slotted link and tension-spring—between the grip-carriage and one arm of the bell-crank, a driving-shaft mounted in the supporting-bed, a crank-arm fast to the driving-shaft, a pitman connecting the crank-arm with the remaining arm of the bell-crank, substantially as and for the purpose specified.

4. The combination, with a track, of a grip-carriage and its grip, mounted and adapted to be slid back and forth thereon, a bell-crank, yieldingly connected, by one of its arms, with the grip-carriage, a grip-carriage stop-lever, normally supporting an adjustable stop in the path of the grip-carriage, to limit its backward travel, a driving-shaft, a crank thereon, a pitman connecting said crank with the remaining arm of the bell-crank, and means for operatively supporting all of said parts, substantially as and for the purpose specified.

5. The combination, with a track, of a grip-carriage and its grip, mounted and adapted to be propelled back and forth thereon, a bell-crank, a yielding connection between one of the arms of the bell-crank and the grip-carriage, a grip-carriage stop-lever, normally supporting an adjustable stop in the path of the grip-carriage, to limit its backward travel, a driving-shaft, a crank-arm fast thereon, a pitman connecting the crank-arm with the remaining arm of the bell-crank, means for swinging the grip-carriage stop-lever and its adjustable stop out of the path of the grip-carriage, at predetermined intervals, and means for operatively mounting and supporting all of said instrumentalities, substantially as and for the purpose specified.

6. In a wire-crimping machine, in combination, a track, a grip-carriage and its grip—consisting of a stationary jaw and a spring-actuated gripping-finger—mounted and adapted to be driven back and forth thereon, a bell-crank, a yielding connection—consisting of a slotted link and spring—between the grip-carriage and one arm of the bell-crank, a grip-carriage stop-lever, having a tripping-cam thereon and normally supporting an adjustable stop in the path of the grip-carriage, to limit its backward travel, a driving-shaft, a crank-arm thereon, a pitman connecting the crank-arm with the remaining arm of the bell-crank, a shaft, a wheel, fast thereto and provided with a wrist arranged to engage the tripping-cam, on the grip-carriage stop-lever, and swing the latter out of the path of the grip-carriage, at predetermined intervals, substantially as and for the purpose specified.

7. In a wire-crimping machine, in combination, a track, a grip-carriage and its grip—consisting of a stationary jaw and a spring-actuated gripping-finger — mounted and adapted to be driven back and forth thereon, a bell-crank, a yielding connection—consisting of a slotted link and tension-spring—between the grip-carriage and one arm of the bell-crank, a grip-carriage stop-lever, having a tripping-cam thereon and normally supporting an adjustable stop in the path of the grip-carriage, to limit its backward travel, a driving-shaft, a crank-arm thereon, a pitman connecting the crank-arm with the remaining arm of the bell-crank, a shaft, a wheel fast thereto and carrying a wrist adapted to engage the tripping-cam, on the grip-carriage stop-lever, and swing the latter out of the path of the grip-carriage, at predetermined intervals, a ratchet-wheel mounted on the last-mentioned shaft, a pawl for driving said ratchet-wheel and shaft, and means for operating said pawl, substantially as and for the purpose specified.

8. In a wire-crimping machine, in combination, a supporting-bed having slideways formed therein, slides adapted to be horizontally reciprocated in the slideways, crimping-dies carried by said slides, a driving-shaft, cams—fast mounted on said shaft—for horizontally reciprocating said slides and dies, substantially as and for the purpose specified.

9. In a wire-crimping machine, in combination, a supporting-bed, lower vertical crimping-dies supported thereby, horizontal levers K K' mounted, at their central portions, on a horizontal pivot-bearing $K^2$, arms L L' projecting downward from the levers K K', upper vertical crimping-dies fast to the lower ends of the arms L L', a driving-shaft, cams $K^4$ $K^5$ fast thereon, antifriction-rollers $K^3$, mounted in the rear ends of the levers K K' and contacting the cams $K^4$ $K^5$ on the driving-shaft, substantially as and for the purpose specified.

10. In a wire-crimping machine, in combination, a supporting-bed, a non-rotatable stud-axle longitudinally adjustable in a bearing therein, a rocking hub mounted, to oscillate, on the stud-axle and provided with transversely-projecting arms $N^4$ $N^5$ $N^6$, a knife $N^7$ fast to the arm $N^4$, a knife $N^8$, longitudinally adjustable in the supporting-bed and adapted to coöperate with the knife $N^7$, a slide-bar having a lug $N^{13}$ thereon for operating the rocking hub and knife $N^7$ on the arm $N^4$ thereof—through the arm $N^6$—a driving-shaft, mounted in the supporting-bed, a cam $I^6$, on the driving-shaft, for operating the slide-bar, and means for rocking said hub to tilt the arm $N^6$ into the path of the lug $N^{13}$, on the slide-bar I, at predetermined intervals, substantially as and for the purpose specified.

11. In a wire-crimping machine, in combination, a supporting-bed, a non-rotatable stud-axle longitudinally adjustable in a bearing therein, a rocking hub mounted, to oscillate, on the stud-axle and provided with transversely-projecting arms $N^4$ $N^5$ $N^6$, a knife $N^7$ fast to the arm $N^4$, a knife $N^8$, longitudinally adjustable in the supporting-bed and adapted to coöperate with the knife $N^7$, a slide-bar having a lug $N^{13}$ thereon for operating the rocking hub and knife $N^7$ on the arm $N^4$ thereof—through the arm $N^6$—a driving-shaft, mounted in the supporting-bed, a cam I⁶, on the driving-shaft, for operating the slide-bar, a shaft and a wheel fast thereto carrying a wrist, adapted to engage the cam $N^{12}$, on the arm $N^5$, and therethrough rock said hub, to tilt the arm $N^6$ into the path of the lug $N^{13}$, on the slide-bar I, at predetermined intervals, substantially as and for the purpose specified.

In testimony whereof we have signed our names to this specification in the presence of two subscribing witnesses.

FREDERICK W. HOEFER.
AUGUST G. HOEFER.
EMIL A. HOEFER.

Witnesses:
D. B. BREED,
W. P. PUTNAM.